(12) United States Patent
Wilson et al.

(10) Patent No.: US 9,258,953 B2
(45) Date of Patent: *Feb. 16, 2016

(54) APPARATUS FOR GROWING LIVING ORGANISMS

(71) Applicants: Daniel J. Wilson, Fresno, CA (US); Cheryl A. Herzer-Wilson, Fresno, CA (US)

(72) Inventors: Daniel J. Wilson, Fresno, CA (US); Cheryl A. Herzer-Wilson, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/262,054

(22) Filed: Apr. 25, 2014

(65) Prior Publication Data
US 2014/0230326 A1    Aug. 21, 2014

Related U.S. Application Data

(63) Continuation of application No. 11/986,404, filed on Nov. 20, 2007, now Pat. No. 8,726,568.

(51) Int. Cl.
*A01G 31/00* (2006.01)
*A01G 31/02* (2006.01)
*A01K 63/00* (2006.01)
*A01G 1/00* (2006.01)

(52) U.S. Cl.
CPC ............... *A01G 31/02* (2013.01); *A01G 1/001* (2013.01); *A01G 31/00* (2013.01); *A01K 63/003* (2013.01); *Y02P 60/216* (2015.11)

(58) Field of Classification Search
CPC .................................................. A01G 31/02
USPC .......... 47/59 R, 60, 62 R, 62 C, 62 N, 63, 65, 47/65.5, 66.6, 79; 137/266, 563, 571, 572
See application file for complete search history.

(56) References Cited

U.S. PATENT DOCUMENTS

| | | |
|---|---|---|
| 2,062,755 A | 12/1936 | Lyons |
| 2,072,185 A | 3/1937 | Schein |
| 2,198,150 A | 4/1940 | Barnhart |
| 2,674,828 A | 4/1954 | Tegner |
| 3,053,011 A | 9/1962 | Silverman |
| 3,250,606 A | 5/1966 | Murray |

(Continued)

FOREIGN PATENT DOCUMENTS

| | | |
|---|---|---|
| DE | 3838160 A1 | 5/1990 |
| EP | 605749 A1 | 7/1994 |

(Continued)

OTHER PUBLICATIONS

Hofmann, G., Device for plant keeping, in particular for cultivated plants, English Abstract of German Patent Publication DE3838160, May 17, 1990, European Patent Organization, http://www.epo.org/searching/free/espacenet.html.

(Continued)

*Primary Examiner* — David Parsley
*Assistant Examiner* — Danielle Clerkley
(74) *Attorney, Agent, or Firm* — Mark D. Miller; William K. Nelson

(57) ABSTRACT

An apparatus for growing living organisms having at least one growing unit adapted to receive at least one living organism, a source of fluid, a conduit operably connecting the source of fluid and the growing unit in fluid supplying relation, and at least one system for supplying the requirements by which the living organism can grow in the growing unit.

28 Claims, 13 Drawing Sheets

(56) References Cited

U.S. PATENT DOCUMENTS

| | | | |
|---|---|---|---|
| 3,868,787 | A | 3/1975 | Wong, Jr. |
| 3,992,809 | A | 11/1976 | Chew |
| 4,118,891 | A | 10/1978 | Kehl et al. |
| 4,152,215 | A * | 5/1979 | Yoshino ................ A01G 31/00 435/286 |
| 4,177,604 | A | 12/1979 | Friesen |
| 4,279,101 | A | 7/1981 | Leroux |
| 4,324,069 | A | 4/1982 | Flagg |
| 4,332,105 | A | 6/1982 | Nir |
| 4,347,687 | A | 9/1982 | Sibbel |
| 4,669,217 | A | 6/1987 | Fraze |
| 4,860,490 | A | 8/1989 | Morris et al. |
| 4,926,585 | A | 5/1990 | Dreschel |
| 5,056,260 | A | 10/1991 | Sutton |
| 5,097,627 | A | 3/1992 | Roberts |
| 5,285,595 | A | 2/1994 | Shirato |
| 5,501,037 | A | 3/1996 | Aldokimov et al. |
| 5,826,374 | A | 10/1998 | Baca |
| 5,876,484 | A | 3/1999 | Raskin et al. |
| 5,887,383 | A | 3/1999 | Soeda |
| 6,233,870 | B1 | 5/2001 | Horibata |
| 7,673,418 | B2 | 3/2010 | Wong |
| 7,861,459 | B2 | 1/2011 | Brooke et al. |
| 2005/0081440 | A1 | 4/2005 | Sauvage et al. |
| 2008/0229661 | A1 | 9/2008 | Brooke et al. |

FOREIGN PATENT DOCUMENTS

| | | |
|---|---|---|
| JP | 03290123 A | 12/1991 |
| JP | 04200328 A | 7/1992 |
| JP | H0646696 B2 | 2/1994 |
| WO | 2008050451 A1 | 5/2008 |

OTHER PUBLICATIONS

Okamoto, K., and Inoue, S., Device of waster culture, English Abstract of Japanese Patent Publication JP03290123, Dec. 19, 1991, European Patent Organization, http://www.epo.org/searching/free/espacenet.html.

Ogawa, S., Apparatus for water culture, English Abstract of Japanese Patent Publication JP04200328, Jul. 21, 1992, European Patent Organization, http://www.epo.org/searching/free/espacenet.html.

Aldokimov, I.V. et al., Process for hydroponic culture of plants and device for carrying out said process, English Abstract of European Patent Publication EP605749, Jul. 13, 1994, European Patent Organization, http://www.epo.org/searching/free/espacenet.html.

Takashi, Y., Plant Culturing Process and Apparatuses Therefor, English Abstract of Japanese Patent Publication JPH0646696, Feb. 22, 1994, European Patent Organization, http://www.epo.org/searching/free/espacenet.html.

Machine translation of JPH0646696, provided by US Patent and Trademark Office in connection with U.S. Appl. No. 11/986,404.

General Hydroponics Product Catalog.

Hirano, N., et al., Method of Cultivating Wasabi and System for Cultivating Wasabi, English Abstract of International Patent Publication WO2008050451, May 2, 2008, European Patent Organization, http://www.epo.org/searching/free/espacenet.html.

* cited by examiner

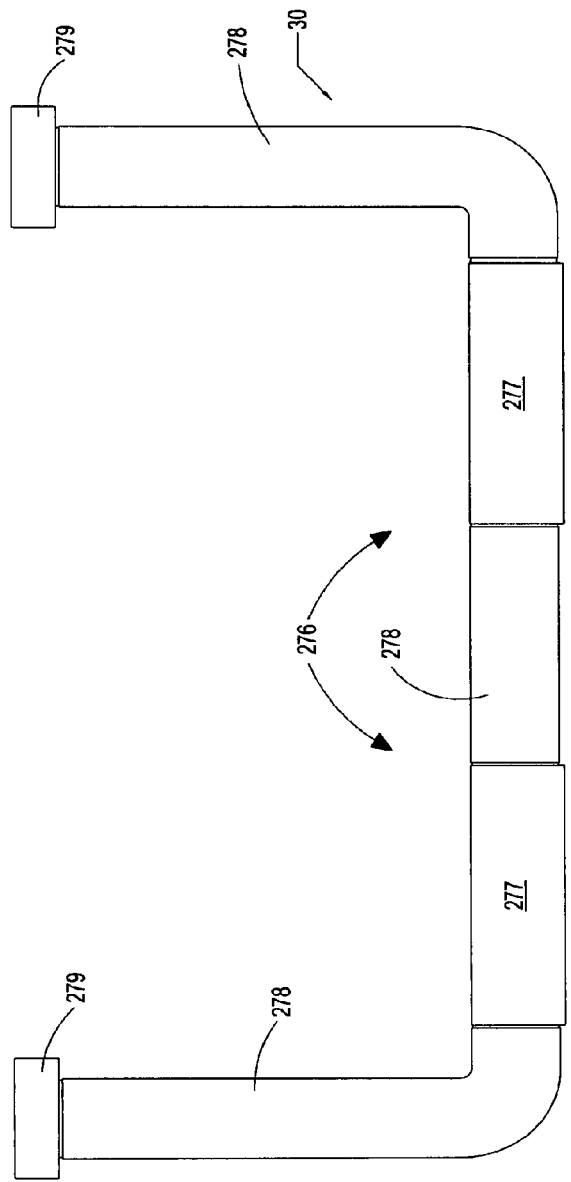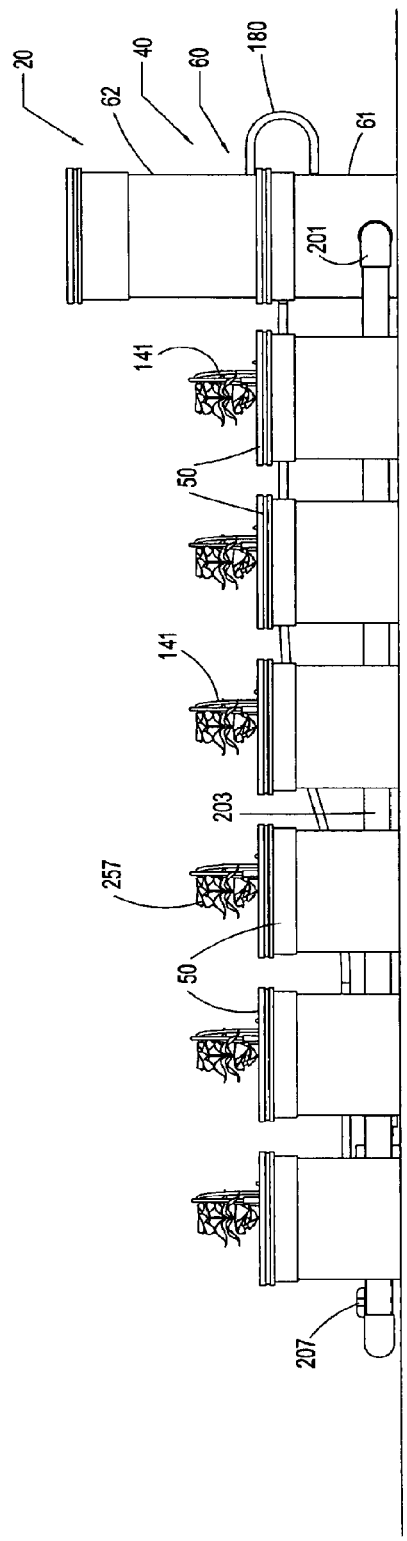
FIG. 2

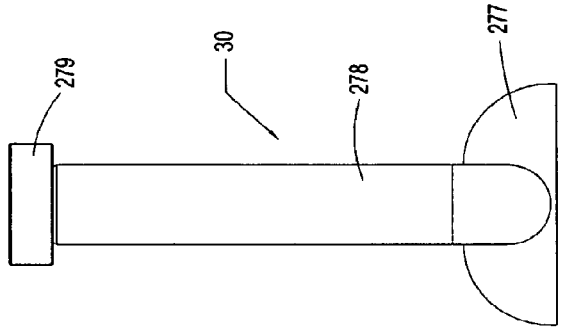
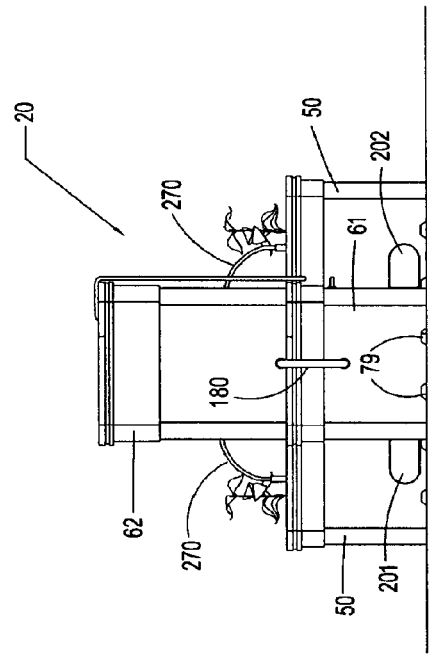
FIG. 3
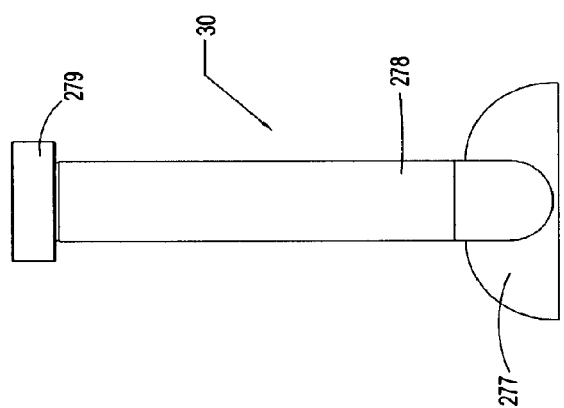
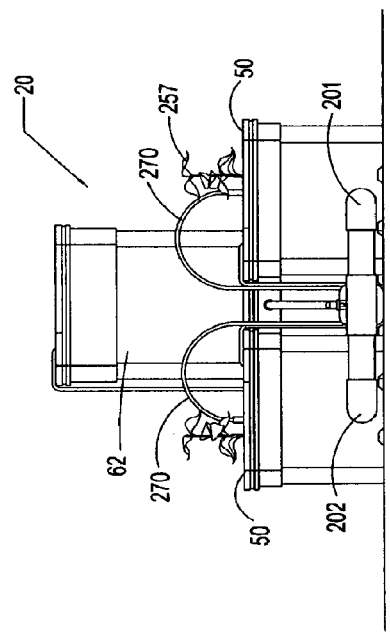
FIG. 4

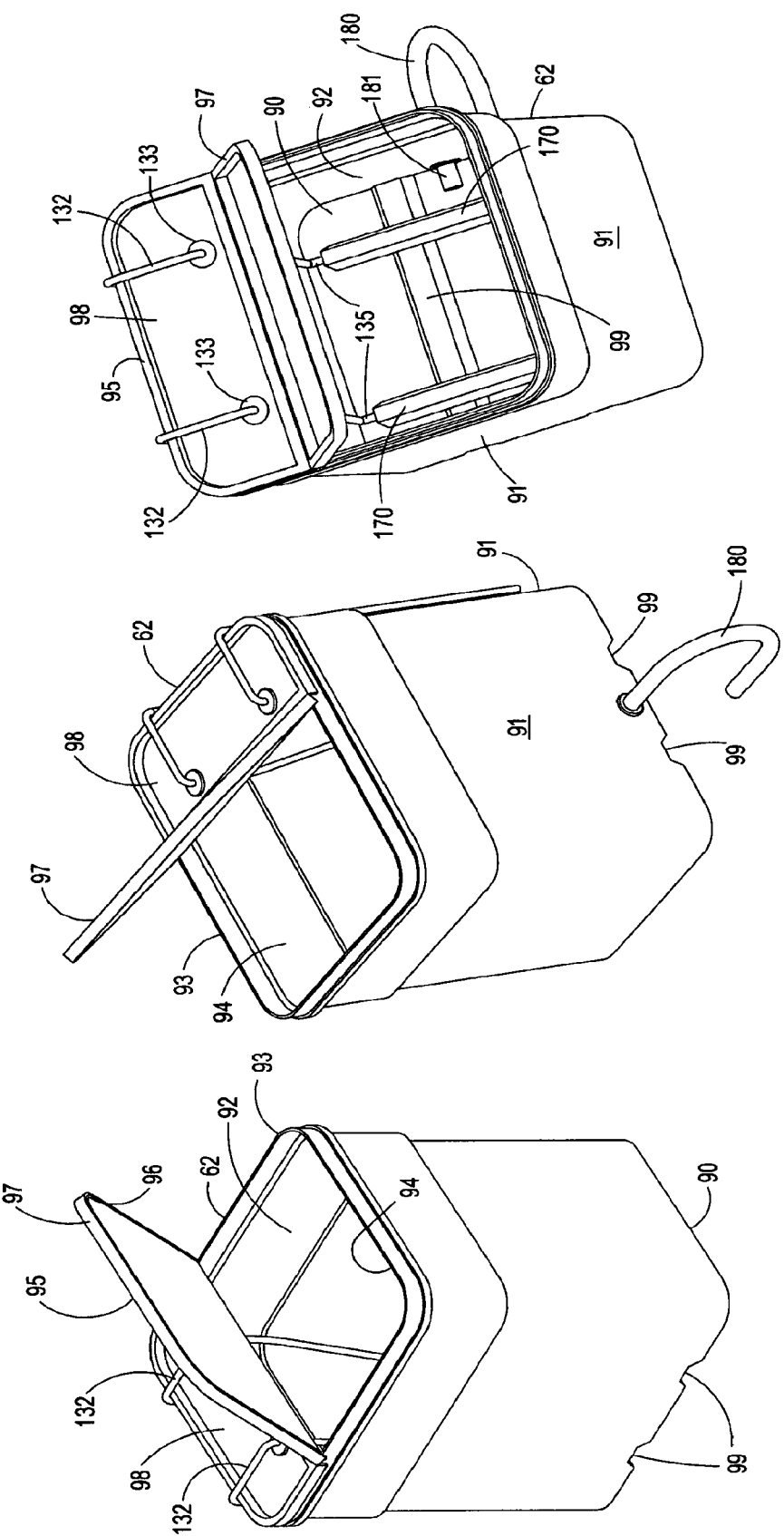

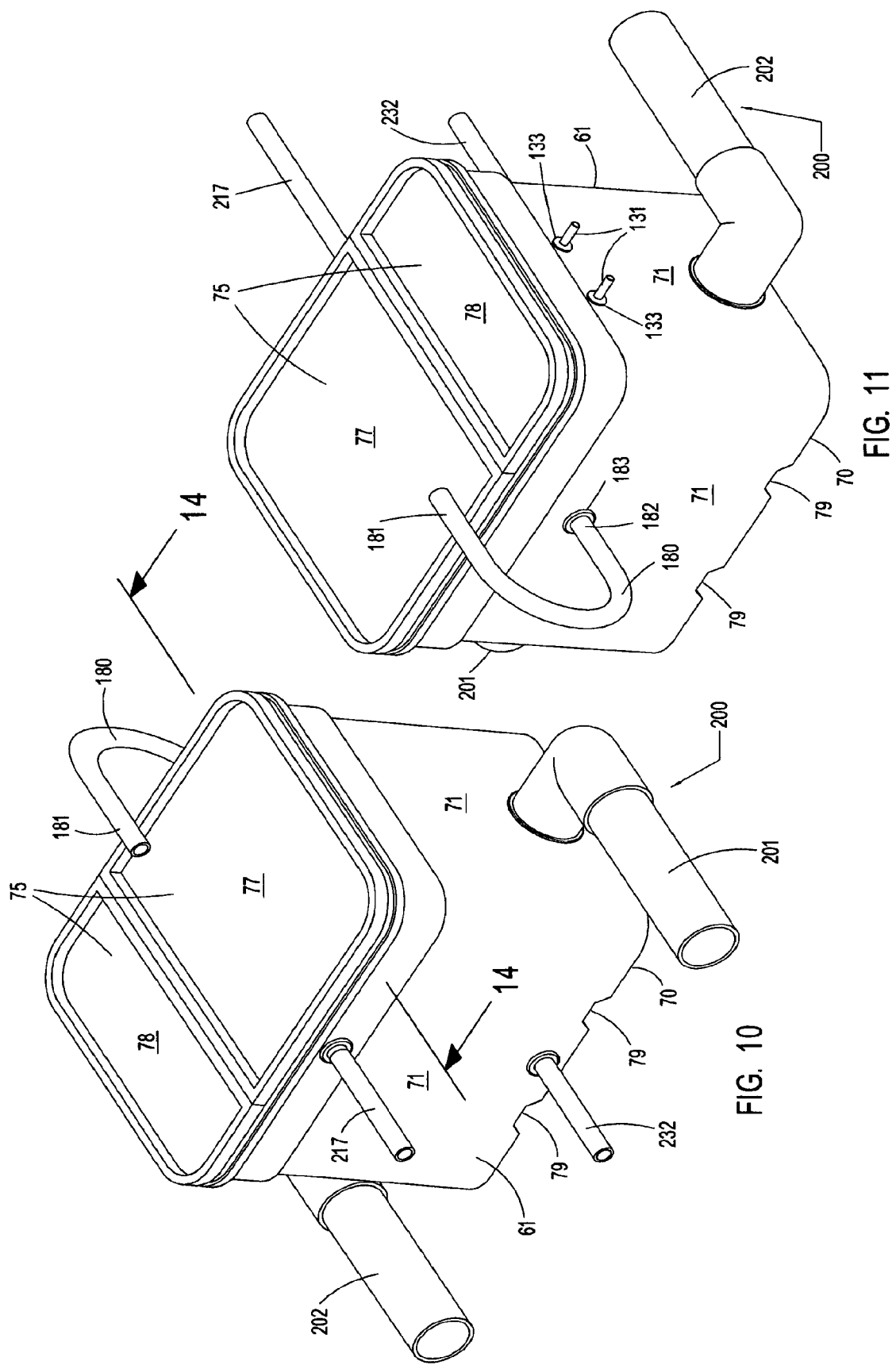

APPARATUS FOR GROWING LIVING ORGANISMS

RELATED APPLICATIONS

This application is a divisional application of U.S. application Ser. No. 11/986,404, filed Nov. 20, 2007, pending, which is incorporated herein by this reference in its entirety.

STATEMENT REGARDING FEDERALLY SPONSORED RESEARCH OR DEVELOPMENT

Not Applicable.

BACKGROUND OF THE INVENTION

1. Field of the Invention

The present invention relates to an apparatus for growing living organisms and, more particularly, to such an apparatus which is operable to promote the growth of living organisms, such as plant life, and to maintain such growth in a desired state of development, for a predetermined period of time, and/or with other operational parameters.

2. Description of the Prior Art

The growth of living organisms, including plant life, is essential to sustaining virtually all life forms. Plant life, for example, provides sustenance for humans, animals and other living organisms. Plant life, in part, uses carbon dioxide from its environment and, through photosynthesis, produces oxygen necessary for creating an atmosphere sufficient to permit all forms of life to be created and sustained.

In its natural form, plant life serves as food for animals, humans and a wide variety of other creatures and organisms. In addition, of course, plant life can be used, processed, or otherwise modified to form a multiplicity of products. Furthermore, new varieties of plant life are continuously being created both spontaneously in nature as well as by human experimentation, plant breeding and the like. Such plant breeding and discovery result both in new forms of plant life which can be employed in a multitude of uses as well as yielding new types of commodities produced thereby. Examples abound in the form of food products such as fruits, nuts, vegetables and the like, and new types of plant life employed for other uses such as in landscaping, construction, heating, medicine and virtually endless other uses.

Plant patents and other forms of protection are available in the United States and in other nations of the world under laws intended to promote the creation, discovery, experimentation and development of new forms or varieties of plant life.

Such creation, discovery, experimentation and development has led to the invention of new methods and apparatuses to assist in the achievement of these objectives. For example, throughout an extensive history, various hydroponic devices, systems and methods have been developed for these and other purposes. Hydroponics is, by definition, the cultivation of plant life in nutrient solution rather than in soil. The purposes for such technology include inexpensively and with a minimum of attention and care to produce and maintain superior specimens of plant life. Concomitantly, there has been a desire to create hydroponic systems which can be employed for virtually all forms of plant life.

Other considerations include the creation of hydroponic systems of virtually any capacity, whether large or small; of systems which can be employed using ambient light as well as, artificial light; which are readily controlled to accommodate changing conditions, both as to the environment in which they are used as well as to the changing requirements of the plant life as it is grown; and which achieve many other long recognized but unrealized objectives. These objectives have eluded achievement notwithstanding the development of various types of hydroponic systems virtually from the beginning of recorded history.

Thus, while some progress has been attained with such efforts, the success, particularly from a commercial standpoint, has been marginal. Without practical and dependable commercial application, true hydroponics has little value other than for limited scientific experimentation as in the case of a plant breeding programs. The production of seedlings for commercial planting is limited by the restricted capacity of conventional hydroponic systems. There is, thus, no prior art hydroponics system capable of providing a sufficient number of seedlings and/or plants necessary for practical commercial application. In summary in this respect, the prior art is replete with hydroponic systems incapable, as a practical matter, of being expanded to produce commercially viable yields.

Therefore, it has long been recognized that it would be desirable to have an apparatus for growing living organisms which is capable of producing commercially practical yields of superior quality plant life and other living organisms; which is operable to provide an optimum growing environment; which is operable to provide superior aeration of the fluid provided to the plant life or the like grown therein; which is operable to provide optimum nutrients in a manner most suited to the particular plant life to be grown; which permits modification thereof to accommodate the changing requirements of the plant life throughout its growth and maturation; which can readily be expanded to provide additional capacity or reduced in size to accommodate a particular desired capacity; which is adapted to provide improved operation in a hydroponic system; and which is otherwise entirely successful in achieving its operational objectives.

BRIEF SUMMARY OF THE INVENTION

Therefore, it is an object of the present invention to provide an improved apparatus for growing plant life and other living organisms.

Another object is to provide such an apparatus which is adapted for use in the growth and maturation of plant life and other living organisms in a manner not heretofore achieved in the art.

Another object is to provide such an apparatus which has particular utility in the growth of plant life wherein the resulting plant life is of a character superior to that which has heretofore been possible.

Another object is to provide improved aeration of the solution supplied to the plant life grown therein as well as providing a symmetrical and unobstructed solution flow.

Another object is to provide such an apparatus which is operable to enable the supply of nutrients and other essential substances and conditions for plant life in a more precise and dependable manner than has heretofore been possible.

Another object is to provide such an apparatus which possesses the capability of consistent or intermittent introduction of the optimum oxygen to the mineral nutrient ratio.

Another object is to provide such an apparatus which permits the individually controlled adjustment of the nutrients and other essentials to growing plant life as the needs of the plant life may vary during the growth and maturation thereof and under any variations in the conditions to which they are subjected.

Another object is to provide such an apparatus which employs superior hydroponics capabilities in the administration of the supply of water, dissolved oxygen, nutrients, light and other substances and conditions required by the plant life during the growth thereof.

Another object is to provide such an apparatus which possesses the capability of being expanded or, alternatively, reduced in size and capacity so as to be operable to provide the precise capacity and level of production desired.

Another object is to provide such an apparatus which is fully capable of providing a complete commercial operation in an entirely practical manner.

Further objects and advantages are to provide improved elements and arrangements thereof in an apparatus for the purposes described which is dependable, economical, durable and fully effective in accomplishing its intended purposes.

These and other objects and advantages are achieved, in the preferred embodiment of the present invention, in an apparatus for growing living organisms having at least one growing unit adapted to receive at least one living organism, a source of fluid, a conduit operably interconnecting the source of fluid and the growing unit in fluid supplying relation, and at least one system for supplying the requirement by which the living organism can grow in the growing unit.

BRIEF DESCRIPTION OF THE SEVERAL VIEWS OF THE DRAWINGS

FIG. 2 is a side elevation of the apparatus of FIG. 1.

FIG. 3 is an elevational view of the apparatus taken from the left, as viewed in FIG. 2.

FIG. 4 is an elevational view of the apparatus taken from the right, as viewed in FIG. 2.

FIG. 7 is a perspective view of the upper supply tank of the apparatus of the present invention viewed principally from the left side thereof, as viewed in FIG. 3, with the lid disposed in an open attitude.

FIG. 8 is a perspective view of the upper supply tank of the apparatus, as viewed principally from the right side thereof, as viewed in FIG. 3, with the lid thereof disposed in an open attitude.

FIG. 9 is a perspective view of the upper supply tank, as viewed principally from the top thereof, as viewed in FIG. 4, and with the lid thereof disposed in an open attitude so as to show the interior of the upper supply tank.

FIG. 10 is a somewhat enlarged, fragmentary, perspective view of the lower supply tank of the present invention viewed principally from the left side thereof, as viewed in FIG. 4.

FIG. 11 is a fragmentary, perspective view of the lower supply tank viewed principally from the right side thereof, as viewed in FIG. 4.

DETAILED DESCRIPTION OF THE INVENTION

Figure 1:
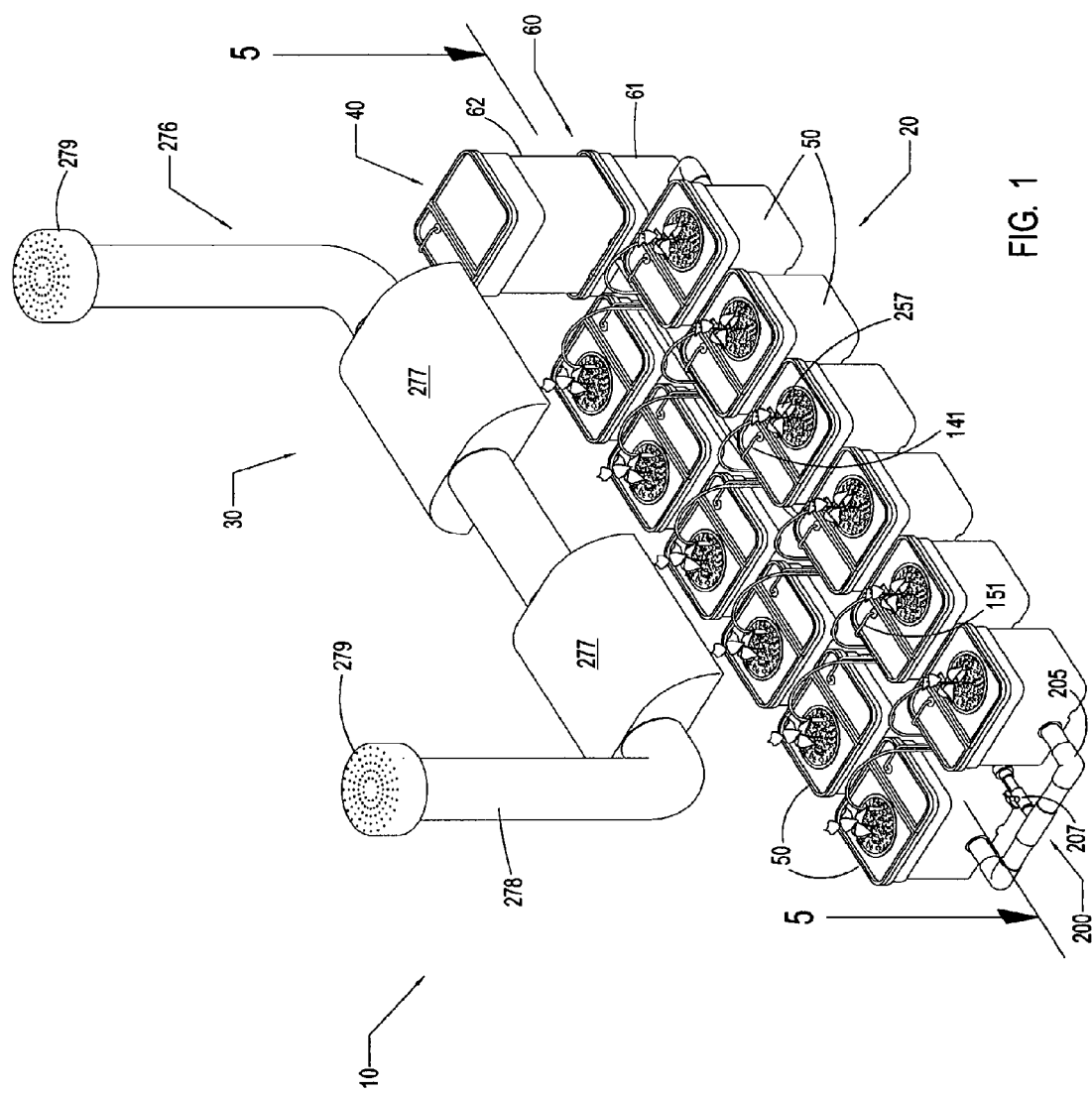
FIG. 1 is a perspective view of the apparatus for growing living organisms of the present invention showing representative living organisms, in this case plant life, being grown therein.

Referring more particularly to the drawings, the apparatus for growing living organisms of the present invention is generally indicated by the numeral 10 in FIG. 1. The apparatus can generally be viewed as having a growing assembly 20 and a lighting assembly 30.

Referring first to the growing assembly 20, it can generally be viewed as having a supply system 40 shown on the right, as viewed in FIG. 2, and a plurality of growing housings or units 50. As shown in the drawings, there are twelve (12) such growing units. More specifically, this is shown in FIGS. 1, 2, 5 and 6. As will hereinafter be described in greater detail, the growing assembly 20 of the apparatus 10 can have a greater or lesser number of growing units. The specific number of growing units selected for use in the growing assembly 20 is discretionary and dependent upon the type of living organisms to be grown, the desired production capacity of the apparatus 10, the preferences as to operation of the apparatus and a variety of other considerations. In the illustrative embodiment shown and described herein, the living organisms are living plants and will hereinafter be referred to as such.

The supply system 40 has a main supply housing 60 having a lower supply tank 61 and an upper supply tank 62. The lower supply tank and upper supply tank are hereinafter referred to, for illustrative convenience, respectively as the lower tank 61 and the upper tank 62. The upper tank is preferably rested on the lower tank as shown, for example, in FIGS. 1, 2 and 4. The lower tank and upper tank are preferably, although not necessarily, constructed of a rigid plastic, or similar material, which is sufficiently strong to support the structure of the apparatus and to perform the functions hereinafter described, while being of light weight.

Figure 13:
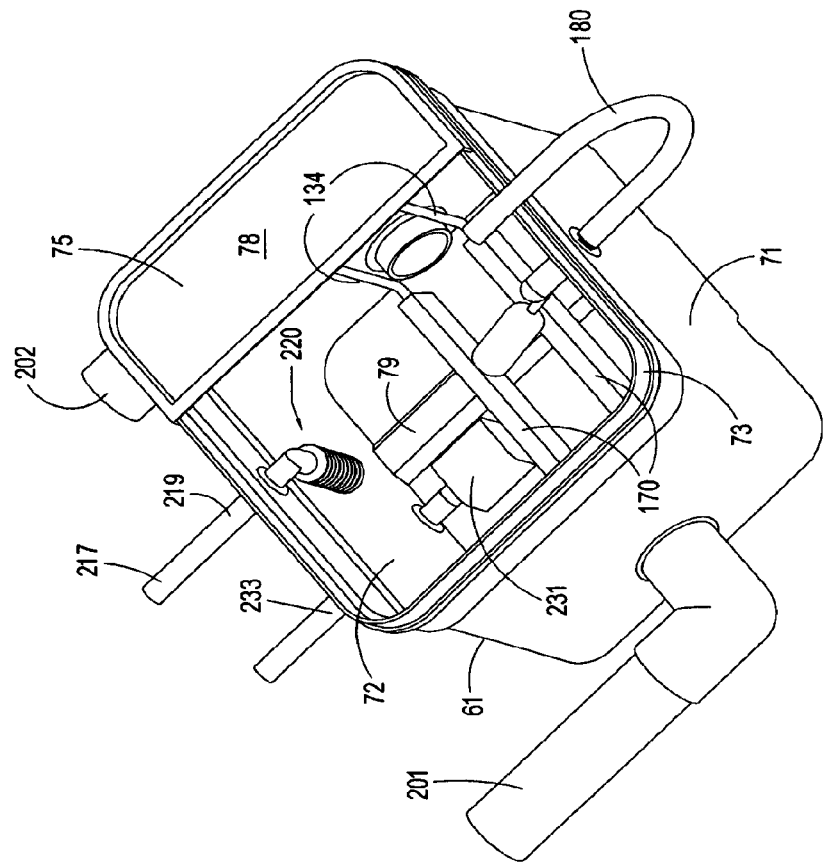
FIG. 13 is a fragmentary, perspective view of the lower supply tank, as viewed principally from the top, as shown in FIG. 4, and with a portion of the lid removed to show the interior of the lower supply tank.
Figure 12:
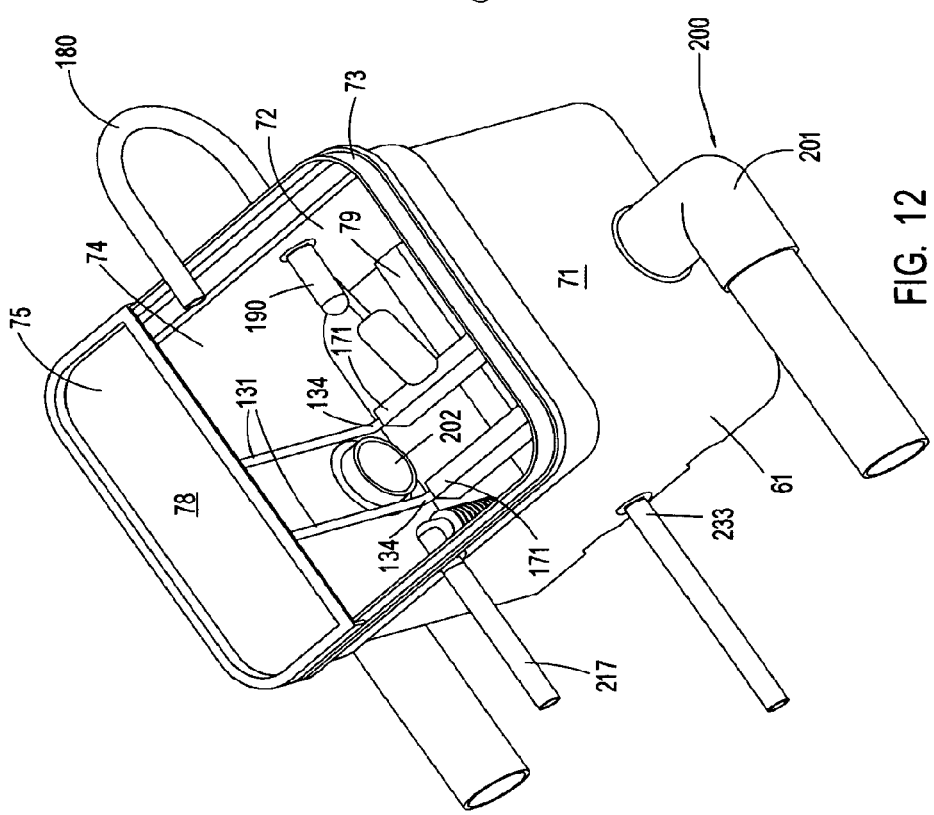
FIG. 12 is a fragmentary, perspective view of the lower supply tank viewed principally from the left side thereof, as viewed in FIG. 4, and with a portion of the lid thereof removed to show the interior of the lower supply tank.

The lower tank 61 is best shown in FIGS. 6, 10, 11, 12, 13 and 14. The lower tank has a floor 70 on which are mounted four (4) upstanding side walls 71 to form a box like configuration. The floor and upstanding side walls are mounted in fluid tight relation to each other define, or bound, an interior 72 of the lower tank. The side walls have a substantially rectangular upper lip 73 bounding an upper opening 74. A lid assembly 75 is removably mounted on the upper lip 73 by being press fitted thereon within a downwardly facing groove 76 extending about the periphery of the lid assembly. The lid assembly is composed of a first section 77 and a smaller second section 78. As shown in FIGS. 12 and 13, the first section 77 has been removed therefrom, leaving the second section 78 in place. For illustrative convenience, the interior 72 is thereby exposed. The interior of the lower tank is perhaps best shown in FIG. 14 in a somewhat enlarged, longitudinal vertical section. The floor 70 has a pair of parallel raised portions or supports 79 extending in across the floor within the interior 72 of the lower tank. The internal operative portions of the apparatus shown in the interior of the lower tank will subsequently be discussed.

The upper tank 62, as heretofore noted, is mounted, or rested, on the lower tank 61, as shown in FIG. 2. The upper tank has a floor 90 bounded by four (4) upstanding side walls extending about the periphery of the floor to form a box like configuration. The floor and upstanding side walls are joined in fluid tight relation to each other to define, or bound, an interior 92 of the upper tank. The side walls of the upper tank have a substantially rectangular upper lip 93 bounding an upper opening 94. A lid assembly 95 is removably mounted on the upper lip 93 by being press fitted thereon within a groove 96 extending about the periphery of the lid assembly. The lid assembly is composed of a first section 97 and a smaller second section 98. As shown in FIGS. 7, 8 and 9, the first section has been pivoted upwardly relative to the second section and while leaving the second section 98 in place. For illustrative convenience the interior 92 of the upper tank 62 is thereby exposed. The floor 90 of the upper tank has a pair of parallel raised portions or supports 99 extending across the floor within the interior 92 of the upper tank. The internal and external operative components of the apparatus will subsequently be discussed.

The apparatus 10 of the present invention, as noted, has a plurality of growing units 50, shown in FIGS. 1, 2, 5, 6, 15, 16, 17 and 18. The specific number of growing units employed in the apparatus can be selected based upon the size of the operation, the yield desired, the preferences of the operator and many other considerations. For illustrative convenience, in the preferred embodiment shown herein, there are twelve (12) growing units arranged in two rows. The growing units of the two rows are disposed in pairs spaced from each other in side-by-side relation. As shown and described herein, each growing unit in the preferred embodiment has a single plant growing therein. However, if desired, a plurality of plants can be grown in each growing unit. Alternatively, the growing units of the second embodiment of the present invention shown in FIG. 19 can be employed, as will hereinafter be described in greater detail.

Figure 17:
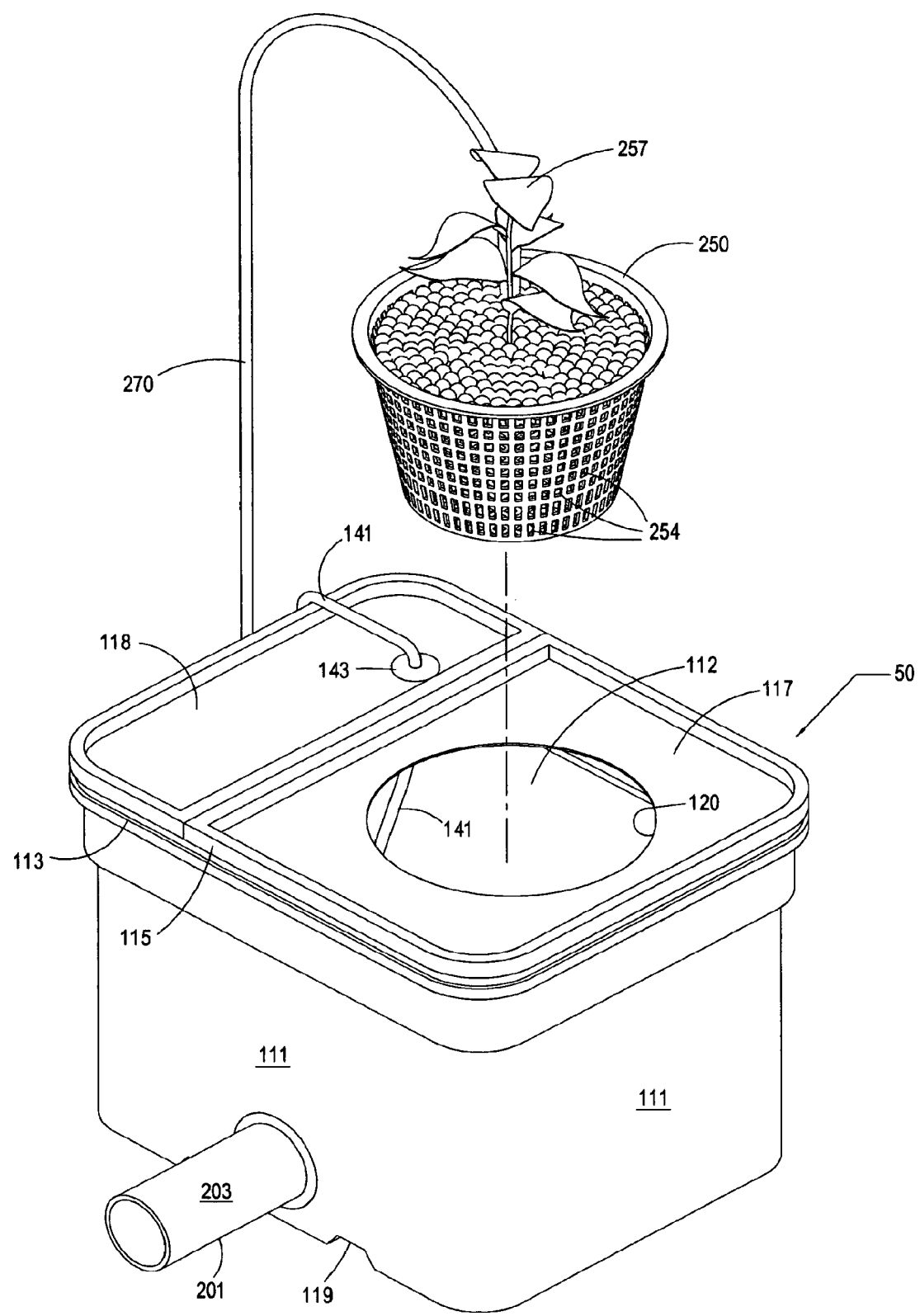
FIG. 17 is a somewhat enlarged, fragmentary, perspective, exploded view of one growing unit shown in FIG. 15.

Each growing unit 50 has a floor 110 having four (4) side walls 111 extending upwardly therefrom the form a box like configuration. The floor and upstanding side walls are mounted in fluid tight relation to each other to define, or bound, an interior 112 of the growing unit. The side walls have a substantially rectangular upper lip 113 bounding an upper opening 114. A lid assembly 115 is removably mounted on the upper lip by being press fitted thereon within a downwardly facing groove 116 extending about the periphery of the lid assembly. The lid assembly is composed of a first section 117 and a smaller second section 118. The floor 110 has a pair of parallel raised portions or supports 119 extending across the floor within the interior 112 of the growing unit 50. The first section of the lid assembly has a hole 120 of a predetermined diameter extending therethrough into communication with the interior 112, as shown in FIG. 17.

Figure 5:
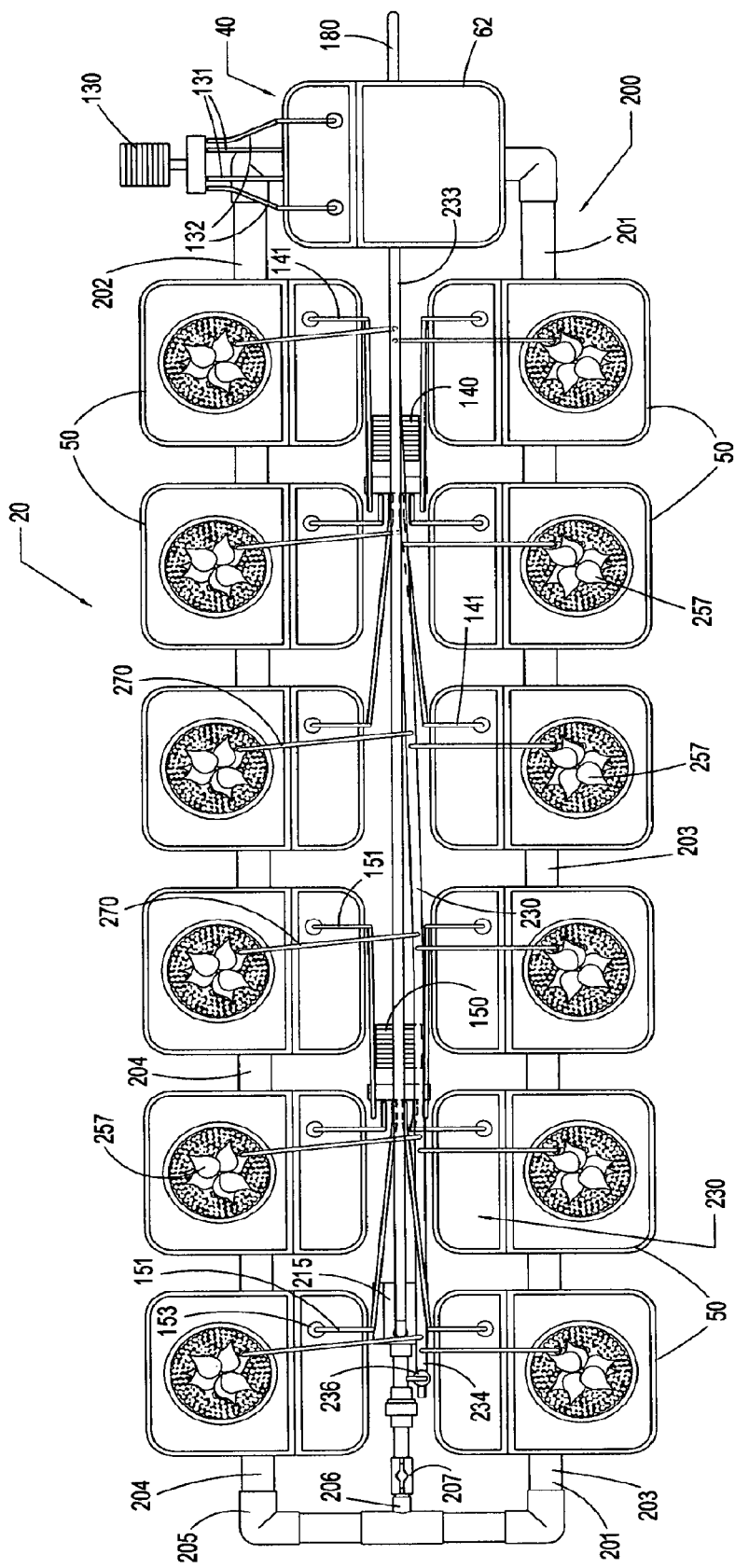
FIG. 5 is a longitudinal, horizontal section taken on line 5-5 in FIG. 1.
Figure 14:
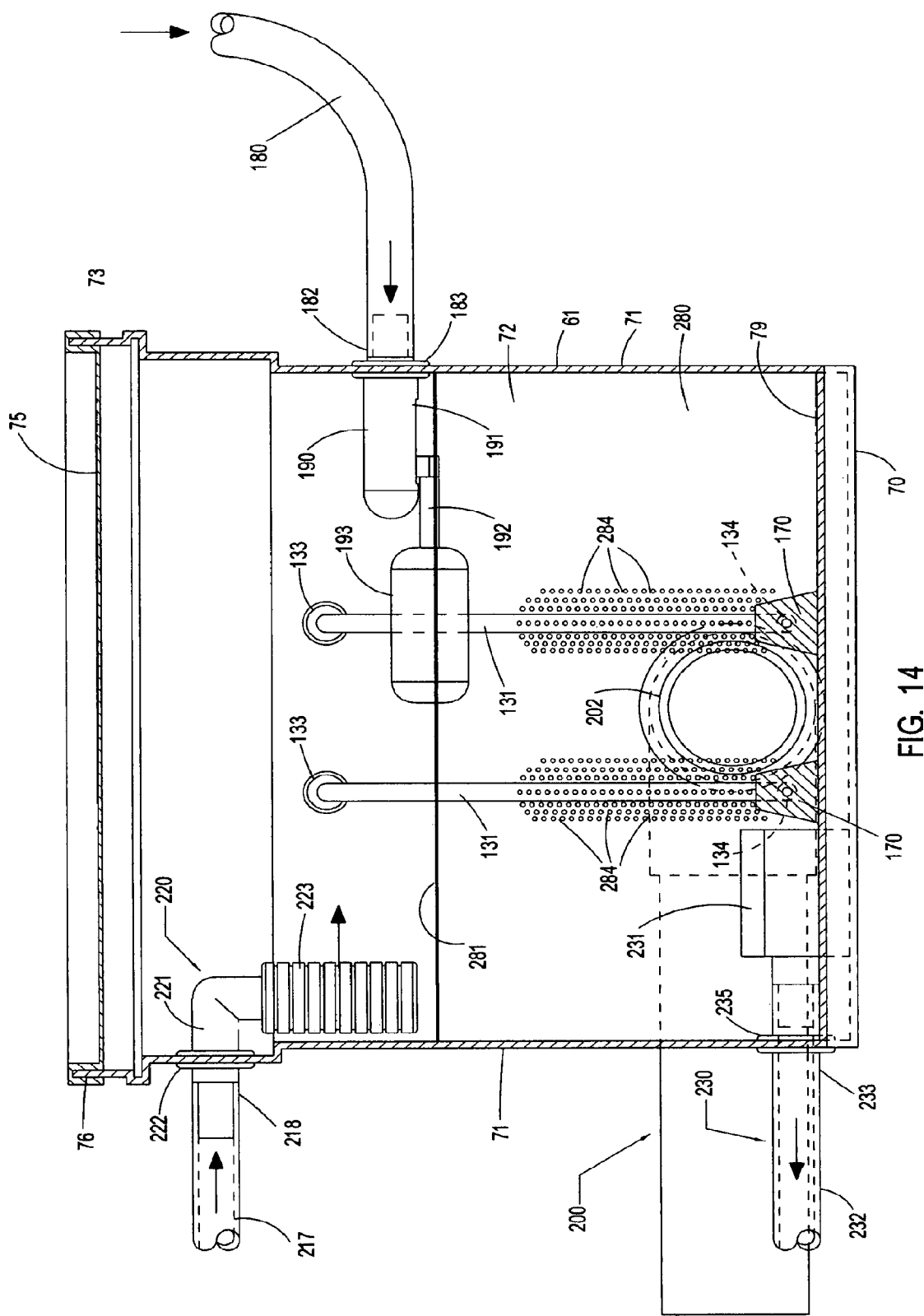
FIG. 14 is a somewhat further enlarged, fragmentary, longitudinal, vertical section taken on line 14-14 in FIG. 10.
Figure 16:
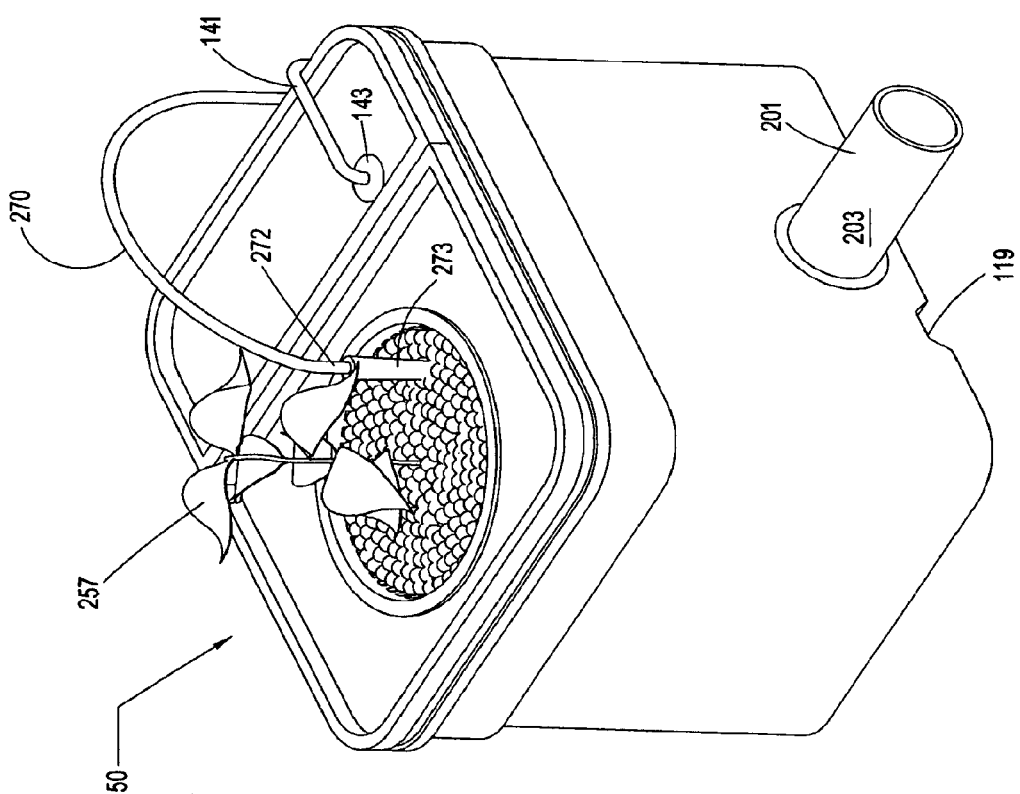
FIG. 16 is a fragmentary, perspective view of the growing unit of FIG. 15 shown principally from the opposite side thereof viewed in FIG. 15.
Figure 15:
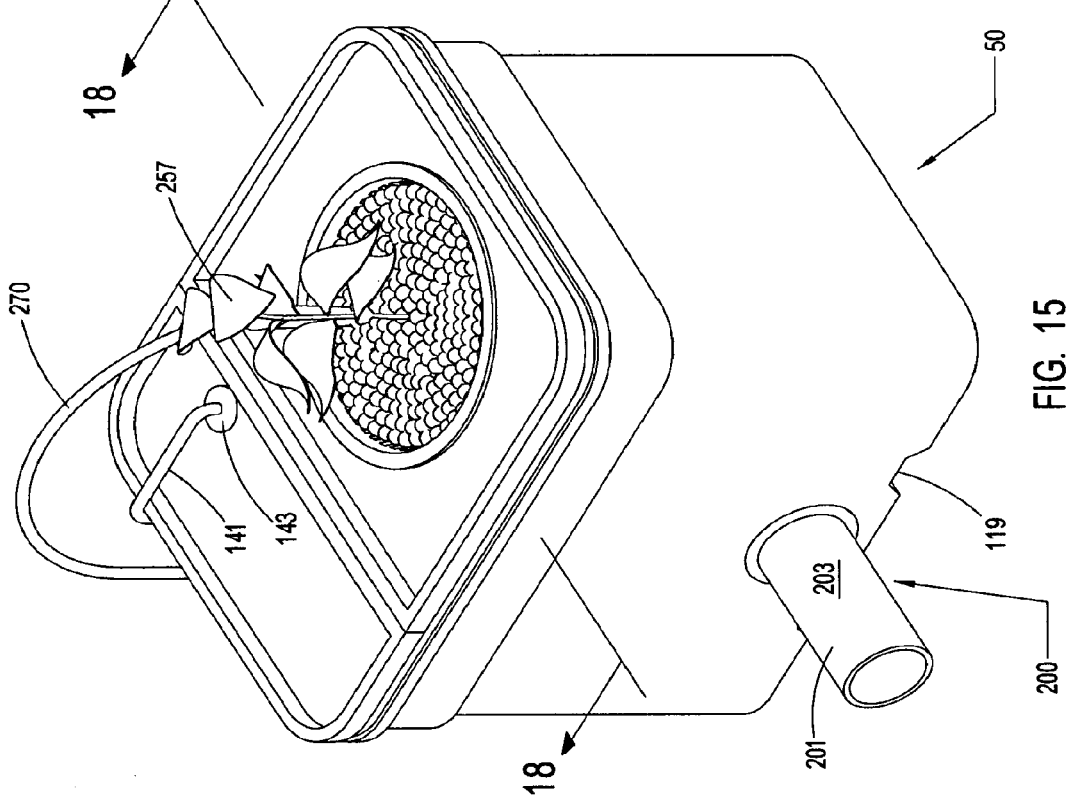
FIG. 15 is a fragmentary, perspective view of one of the growing units of the apparatus of the present invention, as viewed principally from the left in FIG. 4, showing a representative plant growing therein.

The supply system 40 of the apparatus 10 has a first air pump 130 mounted externally of the lower tank 61 and upper tank 62, as best shown in FIG. 5. The first air pump is operably connected to the lower tank by two (2) by first air supply lines 131 which extend from the first air pump, through one of the side walls 71 of the lower tank and into the interior 72 thereof, as best shown in FIG. 14. Two (2) second air supply lines 132 extend from the first air pump, to the upper tank 62 and through the second section 98 of the lid assembly 95 into the interior 92 through the lid assembly 95 into the interior 92 of the upper tank. Each of the first air supply lines and second air supply lines has a fluid seal 133 extending thereabout at the point of extension through the side wall 71 of the lower tank 61 and upper tank 62. The fluid seals operate to prevent leakage about the first air supply lines and second air supply lines. The first air supply lines extend to interior end portions 134 in the interior of the lower tank 61. The second air supply lines extend to interior end portions 135 in the interior of the upper tank 62.

Figure 18:
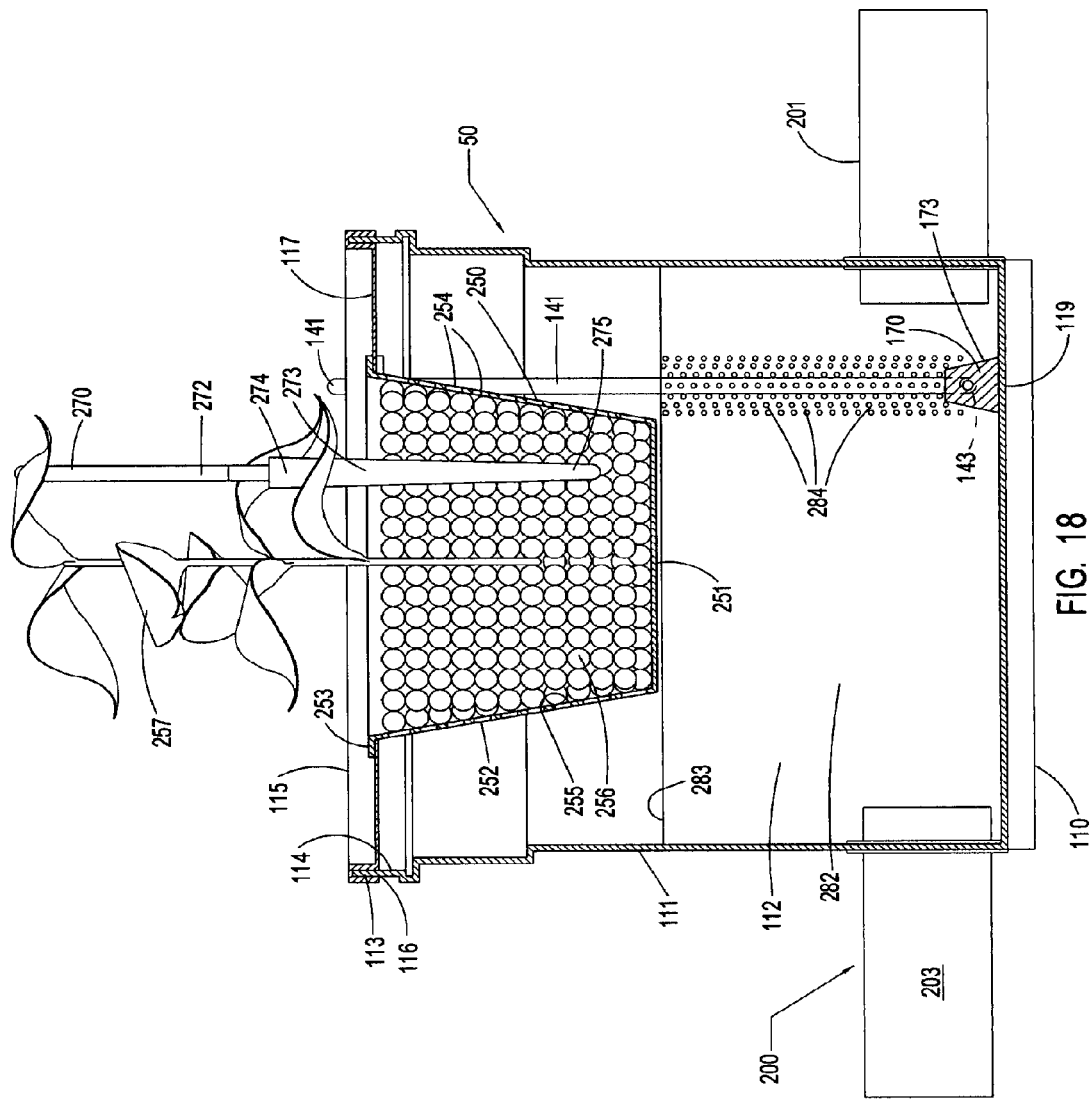
FIG. 18 is a somewhat further enlarged, fragmentary, transverse vertical section taken on line 18-18 in FIG. 15.

The supply system 40 has a second air pump 140 mounted between the two rows of growing units 50 on the right, as viewed in FIG. 5. A growing unit air supply line 141 extends from the second air pump to each of the first six (6) growing units 50 on the right as viewed in FIG. 5; that is, to the three (3) growing units on one side of the second air pump and to the three (3) growing units on the opposite side of the second air pump. Each of these six (6) growing units has a fluid seal 143 through which its respective growing unit air supply line extends into the interior 112 of that growing unit. Each of the growing unit air supply lines extends to an interior end portion 144 within its respective growing unit, as shown in FIG. 18.

The supply system 40 has a third air pump 150 mounted between the two rows of growing units 50 on the left, as viewed in FIG. 5. A growing unit air supply line 151 extends from the third air pump to each of the second six (6) growing units 50 on the left, as viewed in FIG. 5; that is, to the three (3) growing units on one side of the third air pump and to the three (3) growing units on the opposite side of the third air pump. Each of these six (6) growing units has a fluid seal 153 through which its respective growing unit air supply line extends to an interior end portion 154 within its respective growing unit, as shown in FIG. 18.

Two aeration members 170 are individually mounted on the interior end portions 135 of the second air supply lines 132 within the interior 92 of the upper tank 62. The aeration members are mounted on the supports 99 and extend in spaced, substantially parallel relation to each other within the interior of the upper tank, as shown in FIG. 9.

Two aeration members 170 are individually mounted on the interior end portions 134 of the first air supply lines 131 within the interior 72 of the lower tank 61. The aeration members are mounted on the supports 79 and extend in spaced, substantially parallel relation to each other within the interior of the lower tank, as shown in FIGS. 13 and 14.

One aeration member 170 is mounted on the interior end portions 144 and 154 of the growing unit air supply lines 141 and 151 within the interior 112 of each growing unit 50. The aeration member of each growing unit is mounted on the supports 119 extending transversely thereof, as shown in FIG. 18.

Each of the aeration members 170 has a proximal end portion 171 which is connected in air receiving relation to the interior end portions 135, 134 and 144 of their respective second air supply lines 132, first air supply lines 131 and growing unit air supply lines 141 and 151 respectively. Each of the aeration members extends to a distal end portion 172 and has an outer surface 173 which, in cross section, forms a trucated pyramidal configuration. The aeration members can be constructed of any suitable material, but preferably are constructed of a lightweight, porous stone such as lava rock. Each aeration member has a passage running substantially the length thereof and sealed at the distal end portion 172 thereof so that air is pressurized therewithin and is forced through the outer surface 173 and thus from the aeration member, as will hereinafter be described in greater detail.

The upper tank 62 is best shown in FIGS. 7, 8 and 9. The lower tank 61 is best shown in FIG. 14. A discharge conduit 180 extends from a proximal end portion 181 within the interior 92 of the upper tank 62, and in fluid communication therewith, to a distal end portion 182 in fluid communication with the interior 72 of the lower tank 61. The proximal end portion and the distal end portion of the discharge conduit have fluid seals 183 individually extending thereabout where they extend through the side wall 91 of the upper tank and the side wall 71 of the lower tank 61.

A float valve 190 is mounted on the distal end portion 182 of the discharge conduit 180 within the interior 72 of the lower tank 61. The float valve has a valve assembly 191 which is operated by a valve arm 192 mounting a float 193 thereon near the end of the valve arm and near the center of the interior 72 of the lower tank 61. The float and valve arm operate the float valve to close, or shut off, the valve assembly when raised relative thereto and to open the valve assembly to fluid flow therethrough when pivoted downwardly from the closed position shown in FIG. 14. The valve assembly can, for purposes hereinafter described, be temporarily locked in as closed or opened position.

The supply system 40 has a fluid circulation system generally indicated by the numeral 200 in FIG. 5. The fluid circulation system has a left main conduit 201 which is mounted in fluid tight, fluid receiving relation on the side wall 71 of the lower tank 61 on the left, as viewed in FIG. 4. The left main conduit is disposed in fluid receiving relation to the interior 72 of the lower tank. A right main conduit 202 is mounted in fluid tight, fluid receiving relation on the side wall of the lower tank 61 on the right, as viewed in FIG. 4. The right main conduit is disposed in fluid receiving relation to the interior 72 of the lower tank. The left main conduit includes a plurality of left main conduit sections 203 which individually interconnect the lower tank with the nearest growing unit 50 and individually in series with successive growing units in order. The right main conduit includes a plurality of right main conduit sections 204 which individually interconnect the lower tank with the nearest growing unit 50 and individually in series with successive growing units as shown in FIGS. 2 and 5.

Figure 6:
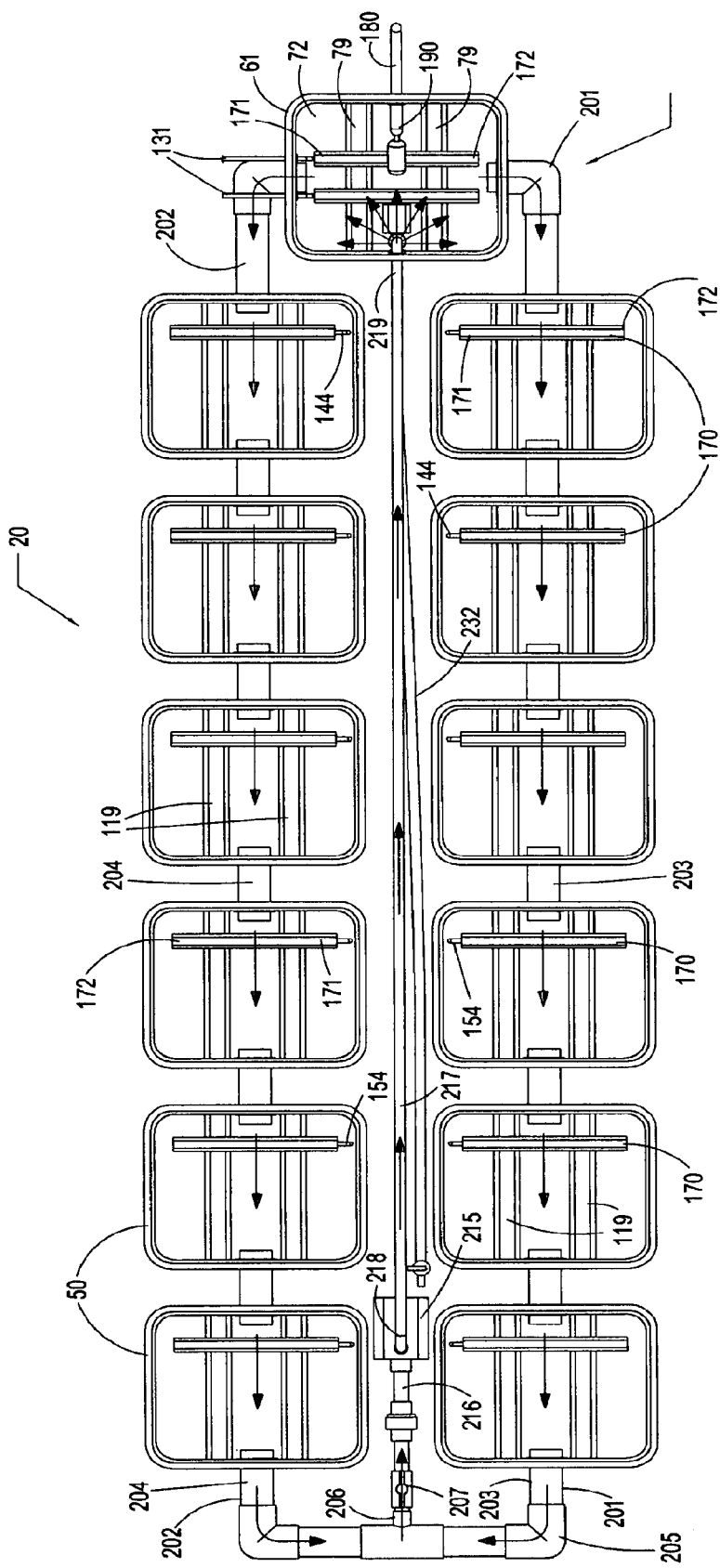
FIG. 6 is a longitudinal, horizontal section of the apparatus showing the structure thereof in relation to the pathways of fluid movement therethrough.

As shown on the left, as viewed in FIG. 6, a return conduit assembly 205 interconnects the last left main conduit section 203 and the last right main conduit section 204 in fluid tight, fluid transferring relation. The return conduit assembly has a central connection 206 mounting a main shut off valve 207. The return conduit assembly has fluid pump 215 which is operably connected to the main shut off valve 207 by a linking conduit 216. A return conduit 217 has a proximal end 218 and an opposite distal end 219. The proximal end of the return conduit is connected in fluid receiving relation to the fluid pump 215. The distal end of the return conduit is disposed in juxtaposition to the lower tank 61.

A fluid dispersal assembly 220 is mounted on the distal end 219 of the return conduit 217 and extends through the adjacent side wall 71 of the lower tank 61, as best shown in FIG. 14. The fluid dispersal assembly has an elbow conduit 221 which directly extends through the side wall 71 in fluid tight relation by virtue of a seal 222 extending thereabout. A fluid discharge housing 223 is mounted on the elbow conduit 221 within the interior 72 of the lower tank 61. The fluid discharge housing is operable to discharge fluid received from the elbow conduit in a splayed pattern in the interior 72 of the lower tank, as shown in FIG. 6.

The apparatus 10 has a nutrient distribution system generally indicated by the numeral 230 in FIG. 14. The nutrient distribution system has a fluid pump 231 mounted on the floor 70 in the interior 72 of the lower tank 61. The fluid pump 231 is operable to receive fluid in the interior 72 and pump the fluid through a main nutrient conduit 232 having a proximal end 233 mounted in fluid receiving relation on the fluid pump 231. The main nutrient conduit 232 has a distal end 234. The proximal end of the main nutrient conduit extends through the side wall 71 of the lower housing in fluid tight relation by virtue of a seal 235 extending thereabout. A fluid valve 236 is operably mounted on the distal end 234 of the main nutrient conduit. The fluid valve 236 is normally disposed in a closed position to seal the distal end 234. When desired, however, the fluid valve can be placed in an open position to drain the main nutrient conduit and thereby the entire apparatus 10, as will hereinafter be described.

Each of the growing units 50 has a plant housing, or basket, 250 mounted in the hole 120 of the first section 117 of the lid assembly 115. The plant basket has a bottom panel 251 having a downwardly tapered side wall 252, as shown in FIGS. 17 and 18. The plant basket has an outwardly extending circular upper lip 253. The plant basket of each growing unit is received and mounted in the hole 120 by the upper lip of each growing unit resting on the first section 117 of the lid assembly 115. The tapered side wall and bottom panel have a multiplicity of passages or openings 254 extending therethrough. The tapered side wall and bottom panel 251 bound and thereby define an interior 255 of the plant basket. The interior of the plant basket contains and is substantially filled with a growing medium 256. In the preferred embodiment, the growing medium is a non-soil material, such as vermiculite, or expanded clay pellets, which absorbs fluids, such as water, nutrients, air, and the like. However, if desired, the growing medium can be soil, a soil and non-soil mixture, or the like.

A representative seedling or plant 257 is shown in FIGS. 1, 2, 3, 4, 5, 15, 16, 17, and 18 growing in the growing medium 256 of each growing unit 50. It will be understood that any type of plant life or other living organisms can be grown in each growing unit. It will similarly be understood that the plant can be grown from seed planted in each growing unit.

The nutrient distribution system 230 includes a plurality of supply conduits 270 each having a proximal end 271 and a distal end 272. The proximal end 271 of each supply conduit is connected in fluid receiving relation to the main nutrient conduit 232. The distal end of each supply conduit is connected in fluid supplying relation to a nutrient release member 273 which is made of a porous material.

The nutrient release member 273 has a proximal end 274 and a distal end 275. Each nutrient release member is received in the growing medium 256 of its respective growing unit 50 in a substantially vertical attitude with the distal end thereof adjacent to the bottom panel 251 of its respective plant basket and in adjacent spaced relation to its respective plant 257, as best shown in FIG. 18.

The lighting assembly 30 of the apparatus 10 of the present invention is shown in FIGS. 1, 2, 3 and 4. The lighting assembly is suspended above and in spaced relation to the growing assembly 20. The lighting assembly is aligned with the growing assembly 20. The lighting assembly is suspended by any suitable means, not shown, in this position. The lighting assembly has a main housing 276 having two (2) spaced, downwardly projecting light fixtures 277. The light fixtures are operable downwardly to project ultraviolet light on the plants 257 within the growing units 50. Other types, or combinations, of light can be projected from the light fixtures as desired.

The main housing 276 has an air duct 278 interconnecting the light fixtures 277 and extending upwardly to a pair of air vent assemblies 279 operable to release heat developed by the light fixtures during operation. The air vent assemblies can have fans, not shown, therein operable to assist in drawing heated air upwardly toward and through the air vent assemblies for upward release of the heated air.

For purposes of describing operation of the apparatus 10, it will be understood that the upper tank 62 is filled to a preselected level therein with a nutrient fluid, not shown. The lower tank 61 is filled, as will be described, with a nutrient fluid 280 to an upper surface or level 281. Similarly, the interior 112 of each growing unit 50 is filled, as will be described, with nutrient fluid 282 to a pre-selected upper surface or level 283. As shown in FIGS. 14 and 18, during operation each aeration member 170 releases air bubbles 284 into the nutrient fluid within the upper tank 62, lower tank 61 and each growing unit 50.

Figure 19:
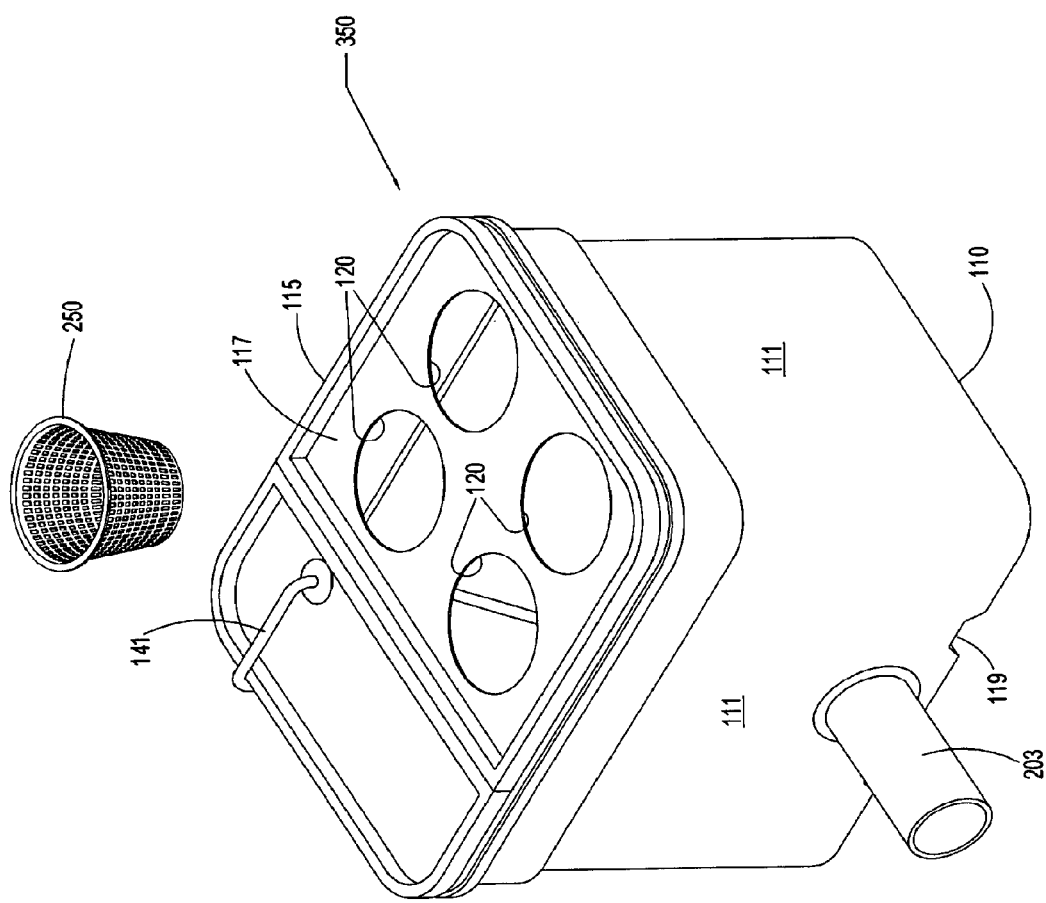
FIG. 19 is a fragmentary, perspective, exploded view of a growing unit of a second embodiment of the apparatus of the present invention.

A second embodiment of the apparatus 10 of the present invention is generally indicated by the numeral 300 in FIG. 19. In the second embodiment, only the growing units are different from those of the first embodiment. The growing units of the second embodiment of the apparatus 10 are generally indicated by the numeral 350. Except as hereinafter discussed, the same reference numerals are used with respect to the growing unit 350 as in the case of the growing units 50 of the first embodiment of the invention heretofore set forth. Thus, the only difference between the growing units 350 and the growing units 50 are that the growing units 350 have four (4) holes 120 individually adapted to receive four (4) plant baskets 250. In addition, each plant basket of the growing units 350 individually have supply conduits 270 with nutrient release members 273. Still further, each plant basket of each growing unit 350 has a plant 257 individually growing therein. In all other respects, the second embodiment 300 of the present invention is the same as the first embodiment heretofore set forth.

Operation

The operation of the described embodiments of the subject invention are believed to be clearly apparent and are briefly summarized at this point.

Reference is first made to the upper tank 62, best shown in FIGS. 7, 8 and 9. A specific fluid is described herein purely for illustrative convenience. It will be understood that any desired fluid can be employed depending, in part, on the specific type of living organism to be grown in the growing units 50. With the first section 97 of the lid assembly 95 disposed in a raised attitude, a fluid, containing the nutrients desired for the stage of development of the plants 257, is placed, or formed, in the interior 92 of the upper tank 62. This fluid would, for example, consist of water containing an admixture of nutrients in the quantities desired, such as, for example, molasses, marine bird guano, phosphoric acid, bat guano, calcium nitrate, potassium sulfate and kelp meal. This nutrient fluid can be one already formulated by a commercial supplier, mixed externally of the upper tank, can be mixed, in whole or in part, within the interior of the upper tank, or can be supplied from any other source.

In any case, before filling of the interior 92 of the upper tank 62 with this resulting nutrient fluid, the valve assembly 191 of the float valve 190 is placed in a closed position. This permits the desired amount of nutrient fluid to be placed in and/or mixed within the upper tank without draining therefrom through the discharge conduit 180 into the interior 72 of the lower tank 61.

During filling of the interior 92 of the upper tank 62 with the nutrient fluid, the first air pump 130 is operated to supply air from the adjacent environment through the second air supply lines 132 to the two (2) aeration members 170 within the upper tank, as best shown in FIG. 9. The air, under pressure, is forced out of the aeration members and introduced to the nutrient fluid in the form of air bubbles 284. The air bubbles buoyantly pass upwardly in the nutrient fluid within the upper tank thereby aerating the nutrient fluid. This process is continued during the presence of nutrient fluid within the upper tank. The first section 97 of the lid assembly 95 can then be closed to prevent the nutrient fluid from inadvertently being contaminated. However, nutrient fluid is continuously added to the interior of the upper tank as the apparatus 10 is operated as necessary to maintain the desired volume of nutrient fluid within the upper tank as it is consumed.

The valve assembly 191 of the float valve 190 is then placed in an opened condition so that the float 193 is free to float and valve arm 192 thus operates the valve assembly in a normal manner. Since, at this time, the interior 72 of the lower tank 61 is empty, the float is gravitationally retained in a lowered position thus maintaining the valve assembly 191 in an opened condition. The opening of the valve assembly causes nutrient fluid 280 gravitationally to flow from the upper tank 62 into the interior 72 of the lower tank 61 through the discharge conduit 180 and the float valve 190. This can best be visualized upon reference to FIG. 14. The interior of the lower tank is filled with the nutrient fluid to a predetermined upper level 281 thereby causing the float 193 and valve arm 192 to move upwardly to operate the valve assembly 191 so that it is placed in the closed position. The float valve thus maintains the predetermined upper level 281 within the lower tank 61, as shown in FIG. 14. The main shut off valve 207 is placed in an opened condition.

At this time, the lower tank 61 is filled with nutrient fluid 280 to the predetermined upper level 281 and is maintained in this condition by operation of the float valve 190. The first air pump 130 pumps ambient air from externally thereof through the first air supply lines 131 into the two (2) aeration members 170. This releases air bubbles 284 from the aeration members to pass upwardly through the nutrient fluid 282 therewithin continuously to aerate the nutrient fluid and supply diffused oxygen into the nutrient fluid.

Nutrient fluid 280 passes, by way of gravity flow, from the interior 72 of the lower tank 61, through the fluid circulation system 200 along the left main conduit 201 and the right main conduit 202. As shown best in FIG. 6, the nutrient fluid is thereby passed through the six (6) pairs of growing units 50 to maintain a volume of nutrient fluid 282 within each growing unit reaching the upper level 283 thereof, as shown in FIG. 18.

Ambient air is pumped through the growing unit 50 air supply lines 141 and 151 by the second air pump 140 and the third air pump 150. The air is thus pumped into the aeration members 170 from which air bubbles 284 are released into the nutrient fluid 282 so as buoyantly to rise through and supplying diffused oxygen thereto. Since nutrient fluid continues to pass along the left and right main conduits 201 and 202, respectively, through the growing units, a degree of fluid circulation is established in the nutrient fluid within each growing unit. This continues to mix the ingredients within the nutrient fluid as well as to distribute the air bubbles within the nutrient fluid. This, once again, causes continued aeration of the nutrient fluid.

As can be seen in FIG. 18, the upper level 283 of the nutrient fluid 282 within each growing unit 50 is just immediately beneath the bottom panel 251 of that growing unit's respective plant basket 250. The fluid circulation causes periodic contact of the nutrient fluid with the bottom panel and the growing medium 256 therewith which, as in the case of vermiculite, or expanded clay pellets, absorbs and retains the aerated nutrient fluid for absorption as needed by the plant 257. Additionally, such aeration and fluid circulation releases vapor of the nutrient fluid above the upper level 283 within the growing unit for absorption for the same purpose by the growing medium.

Still further, the supply conduits 270 of the nutrient distribution system 230, under the impetus of the fluid pump 231, supply nutrient fluid 282 to the individual nutrient release members 273 within the growing medium 256 of each growing unit 50. As can best be seen upon reference to FIG. 18, each nutrient release member is vertically oriented within the growing medium of its respective plant basket 250 adjacent to the plant 257 thereof. Thus, nutrient fluid is absorbed by the growing medium for consumption by the plant 257 thereof. Any of the nutrient fluid not absorbed by the growing medium is released through the openings 254 to drain from the plant basket into the nutrient fluid within the growing unit.

As can be visualized upon reference to FIG. 6, the nutrient fluid 282 passing along the left main conduit 201 and right main conduit 202 reaches and passes into the return conduit assembly 205. From the return conduit assembly, the nutrient fluid passes, in sequence, through the main shut off valve 207; the linking conduit 216; the fluid pump 215; the return conduit 217; the fluid discharge housing 223; and, in a spray pattern, back into the interior 72 of the lower tank 61. The lower tank thus pulls, in effect, the nutrient fluid back into the lower tank. The spray pattern disperses the nutrient fluid about the interior of the lower tank and assists again in mixing the ingredients comprising the nutrient fluid within the lower tank.

The nutrient distribution system 230 supplies the nutrient fluid 282 to the respective nutrient release members 273 of the individual growing units 50. This is achieved through the nutrient distribution system by means of the fluid pump 231 of the lower tank 61 adjacent to the floor 70 thereof into the main nutrient conduit 232. This can best be visualized upon reference to FIG. 14.

Nutrient fluid 282, under pressure from the fluid pump 231, is passed through and along the main nutrient conduit 232 from right to left, as viewed in FIG. 5. At this time, of course, the fluid valve 236 is in a closed condition. The nutrient fluid, under fluid pressure, is passed through the individual supply conduits 270 and into their respective nutrient release members 273 of the individual growing units 50. The nutrient fluid is emitted by each nutrient release member into the growing medium 256 which absorbs the nutrient fluid for retention until taken in by the plant 257 as it grows. Any surplus nutrient fluid leaks from the growing medium, through the openings 254 in each plant basket 250 and drains into the nutrient fluid 282 within each growing unit. The surplus nutrient fluid within the growing units continues to be circulated through the fluid circulation system 200, as previously discussed.

The light fixtures 277 of the main housing 276 of the lighting assembly 30 are operated to provide ultraviolet light for the plants 257 therebelow within the growing units 50. This permits photosynthesis to take place within the plants as necessary for plant growth. The air duct 278 and air vent assemblies 279 draw off heat produced by the light fixtures so as to avoid damage to the plants and otherwise to provide an optimum growing environment.

When the main shut off valve 207 is closed, the nutrient fluid 282 is thus prevented from entering the return conduit 217 and passing back through the return conduit to the interior 72 of the lower tank 61. Return to the interior of the lower tank can only be through the left main conduit 201 and the right main conduit 202 reversing the normal direction of movement therethrough. Opening of the fluid valve 236 and continued operation of the fluid pump 231 causes the entire apparatus 10 to be emptied of nutrient fluid through the lower tank 61, main nutrient conduit 232 and the fluid valve 236. This may be done for purposes of cleaning the apparatus, mixing and using a different fluid, or for any other desired purpose.

It will be understood that all components of the apparatus 10 requiring electrical power for operation are supplied therewith, as necessary, through suitable electrical and control systems, not shown.

The second embodiment 300 of the apparatus 10, shown in FIG. 19, operates in the same manner heretofore described. The only substantial difference is that the growing unit 350 of the second embodiment each has four (4) plant baskets 250 individually provided with the supporting systems heretofore described.

In both the first embodiment 10 and the second embodiment 300, the plant baskets 250 are not fastened to their respective growing units 50 and 350. The plant baskets are simply held in position by gravity with their individual upper lips 253 rested on the first section 117 of the lid assembly 115 of its respective growing unit. Consequently, each plant basket can be lifted from its respective growing unit, the growing unit air supply line 141 and supply conduit 270 removed therefrom, and the plant thereof removed after completion of their productive lives, or any other intended usage. There are no other removal requirements. Similarly, with or without replacement of the growing medium 256, a new seed or seedling or other living organism can be planted in the growing medium within the plant basket; the plant basket reinserted, as descried, in its respective growing unit; and the growing unit air supply line and supply conduit reattached. The apparatus requires no other installation steps.

Significantly, in the apparatus 10 of the present invention is distinct from the prior art in numerous important respects. This includes, but not limited to, the fact that the nutrient fluid is continuously circulated during operation and thus is not stagnant; that the nutrient fluid level can be raised or lowered as desired; and that there is continuous aeration of the nutrient fluid.

Still further, the employment of an in-line fluid pump produces peripheral negative pressure which moves the nutrient solution, or fluid, to a central control module, that being the lower supply tank 61. This achieves rapid surface aeration. Supplemental dissolved oxygen is individually supplied to each of the growing units 50 by way of the aeration members 170. Thus, a perpetual nutrient cycling system is established for the growing units 50 which, in addition, delivers replenished dissolved oxygen to each of the growing units during operation of the circulatory in-line fluid pump. The underlying manifold interconnects the growing units to enable nutrient solution to be supplied symmetrically beneath the plant roots of the growing units.

Therefore, the apparatus for growing living of the present invention is capable of producing commercially practical yields of superior quality plant life and other living organisms; is operable to provide an optimum growing environment; is operable to provide superior aeration of the fluid provided to the plant life or the like grown therein; is operable to provide optimum nutrients in a manner most suited to the particular plant life to be grown; permits modification thereof to accommodate the changing requirements of the plant life throughout its growth and maturation; can readily be expanded to provide additional capacity or reduced in size to accommodate a particular desired capacity; is adapted to provide improved operation in a hydroponic system; and is otherwise entirely successful in achieving its operational objectives.

Although the invention has been herein shown and described in what is conceived to be the most practical and preferred embodiments, it is recognized that departures may be made therefrom within the scope of the invention which is not to be limited to the illustrative details disclosed.

What is claimed is:

1. A system for growing living organisms having a continuous horizontal path for delivering a fluid to said living organisms comprising:
    a plurality of growing units, a fluid supply tank, and a return pump interconnected by a system of horizontal pipes, the fluid supply tank being in gravitational fluid supplying relation to said plurality of growing units and said system of horizontal pipes comprising
        a fluid delivery pipe directly connecting said fluid supply tank to a first growing unit of said plurality of growing units,
        a plurality of inter-unit pipes, each inter-unit pipe connecting two adjacent growing units, wherein said plurality of growing units are connected in a series by said plurality of inter-unit pipes, and
        a collection pipe connecting an end growing unit of said plurality of growing units to said return pump, said return pump being capable of applying negative pressure to the fluid in said collection pipe and drawing the fluid from said end growing unit of said plurality of growing units and returning the fluid to said fluid supply tank, wherein the longitudinal axes of said fluid delivery pipe, said plurality of inter-unit pipes, and said collection pipe are substantially aligned with a first horizontal plane,
        wherein each growing unit of said plurality of growing units includes at least one housing for containing a living organism; and
    a fluid delivery system operable to deliver the fluid to said at least one housing in each of said growing units, wherein the fluid delivery system includes a delivery pump, and a fluid conduit system interconnecting the delivery pump and fluid delivery members disposed in said at least one housing in each of said growing units.

2. The system of claim 1, wherein each of said plurality of growing units has a horizontal bottom interior surface on a second horizontal plane.

3. The system of claim 1, further comprising a valve assembly in said fluid supply tank for maintaining the fluid in said plurality of growing units and said fluid supply tank at a same predetermined level on a third horizontal plane.

4. The system of claim 3 wherein said at least one housing for containing a living organism has a bottom surface that is immediately above said third horizontal plane.

5. The system of claim 4, wherein said at least one housing contains a growing medium therein for nourishing said living organism.

6. The system of claim 5, wherein said growing medium absorbs the fluid passing below said at least one housing.

7. The system of claim 1, further comprising a return pipe connecting said return pump to said fluid supply tank.

8. The system of claim 1, wherein said fluid supply tank, said fluid delivery pipe, said plurality of growing units, said plurality of inter-unit pipes, said collection pipe, and said return pump are interconnected in gravitational fluid supplying relation along a continuous and substantially horizontal path of travel facilitating gravity flow of the fluid through said horizontal path.

9. The system of claim 1, wherein said at least one housing contains a growing medium and at least one of said fluid delivery members releases the fluid into said growing medium.

10. The system of claim 1, wherein said plurality of inter-unit pipes are longitudinally aligned on said first horizontal plane.

11. The system of claim 1, wherein said system is expandable to include additional growing units in said plurality of growing units.

12. The system of claim 1, wherein said system is expandable to include at least one additional plurality of growing units, said at least one additional plurality of growing units being separate from said plurality of growing units.

13. An apparatus for growing living organisms comprising:
    a plurality of fluid carrying growing units interconnected in a growing unit series by a plurality of inter-unit pipes for delivering a fluid to said plurality of fluid carrying growing units, each growing unit having an interior horizontal lower surface located on a first substantially horizontal plane, each unit adapted to receive at least one living organism, and each inter-unit pipe directly connecting lower portions of two adjacent growing units of said plurality of fluid carrying growing units, said inter-unit pipes being longitudinally positioned on a second substantially horizontal plane;
    a pump system connected to an end growing unit of said plurality of fluid carrying growing units by an end pipe, said pump system for applying a negative pressure to said fluid in said end pipe, said end pipe being longitudinally positioned on said second horizontal plane; and
    a tank having an interior horizontal lower surface located on said first substantially horizontal plane, said tank providing a source of said fluid and being directly connected to a first growing unit of said plurality of growing units by a fluid supplying pipe, said fluid supplying pipe being longitudinally positioned on said second substantially horizontal plane, wherein said tank is operable to supply said fluid to said plurality of fluid carrying growing units by continuous gravity flow through said plurality of fluid carrying growing units and said plurality of inter-unit pipes,
    wherein said tank, said fluid supplying pipe, said plurality of fluid carrying growing units, said plurality of inter-unit pipes, said end pipe, and said pump system are interconnected in a series and in gravitational fluid supplying relation along a continuous and substantially horizontal path of travel facilitating gravity flow of the fluid through said series.

14. The apparatus of claim 13, wherein said plurality of inter-unit pipes are longitudinally aligned on said second substantially horizontal plane.

15. The apparatus of claim 13, further comprising a return pipe provided between said pump system and said tank, wherein said return pipe directly connects said pump system and said tank.

16. The system of claim 13, further comprising a valve assembly in said tank for maintaining the fluid in said plurality of fluid carrying growing units and said tank at a same predetermined level on a third substantially horizontal plane.

17. The system of claim 16 wherein each growing unit includes at least one housing for containing a living organism, said housing having a bottom surface that is immediately above said third substantially horizontal plane.

18. The system of claim 13, wherein each of said plurality of fluid carrying growing units includes at least one housing for containing a living organism.

19. The system of claim 18, further comprising a fluid delivery system operable to deliver the fluid to said at least one housing in each of said plurality of fluid carrying growing units.

20. The system of claim 19, wherein the fluid delivery system includes a delivery pump, and a fluid conduit system interconnecting the delivery pump and fluid delivery members, said fluid delivery members positioned in said at least one housing in each of said plurality of fluid carrying growing units.

21. The system of claim 20, wherein said at least one housing contains a growing medium and said fluid delivery member releases the fluid into said growing medium.

22. A system for growing living organisms comprising:
a first plurality of interconnected fluid carrying growing units, each of said first plurality of interconnected fluid carrying growing units adapted to receive at least one living organism,
a first plurality of inter-unit pipes each such pipe connecting lower portions of two adjacent fluid carrying growing units of said first plurality of interconnected fluid carrying growing units, wherein each of said first plurality of inter-unit pipes is longitudinally positioned on a first horizontal plane;
a second plurality of interconnected fluid carrying growing units, each of said second plurality of interconnected fluid carrying growing units adapted to receive at least one living organism,
a second plurality of inter-unit pipes each such pipe connecting lower portions of two adjacent fluid carrying growing units of said second plurality of interconnected fluid carrying growing units, wherein each of said second plurality inter-unit pipes is longitudinally positioned on a said first horizontal plane, wherein each fluid carrying growing unit of said first and second pluralities of interconnected fluid carrying growing units includes at least one housing for containing a living organism;
a pump engaged with a manifold, said manifold being connected to a first collection pipe and a second collection pipe, said first collection pipe connecting said manifold to an end fluid carrying growing unit of said first plurality of interconnected fluid carrying growing units and said second collection pipe connecting said manifold to an end fluid carrying growing unit of said second plurality of interconnected fluid carrying growing units, said pump being capable of applying a negative pressure to a fluid in said first and second collection pipes;
a tank providing said fluid;
a first delivery pipe and a second delivery pipe, said first delivery pipe connecting said tank to a first fluid carrying growing unit of said first plurality of interconnected fluid carrying growing units and said second delivery pipe connecting said tank to a first fluid carrying growing unit of said second plurality of interconnected fluid carrying growing units; and
a return pipe connecting said pump to said tank for returning said fluid to said tank, wherein said tank, said first delivery pipe, said first plurality of interconnected fluid carrying growing units, said first plurality of inter-unit pipes, said pump, and said first collection pipe are interconnected in a first series and in gravitational fluid supplying relation along a first continuous and substantially horizontal path of travel facilitating gravity flow of the fluid through said first series, and said tank, said second delivery pipe, said second plurality of interconnected fluid carrying growing units, said second plurality of inter-unit pipes, said pump, and said second collection pipe are interconnected in a second series and in gravitational fluid supplying relation along a second continuous and substantially horizontal path of travel facilitating gravity flow of the fluid through said second series.

23. The system of claim 22, wherein said first plurality of inter-unit pipes are longitudinally aligned along the first substantially horizontal path of travel, and said second plurality of inter-unit pipes are longitudinally aligned along the second substantially horizontal path of travel.

24. The system of claim 22, further comprising a valve assembly in said tank for maintaining the fluid in said first and second pluralities of interconnected fluid carrying growing units and said tank at a predetermined level on a second horizontal plane.

25. The system of claim 24, wherein said at least one housing in each growing unit of said first and second pluralities of interconnected fluid carrying growing units has a bottom surface that is immediately above said second horizontal plane.

26. The system of claim 25, further comprising a fluid delivery system operable to deliver the fluid to said at least one housing in each growing unit of said first and second pluralities of interconnected fluid carrying growing units.

27. The system of claim 26, wherein the fluid delivery system includes a delivery pump, and a fluid conduit system interconnecting the delivery pump and fluid delivery members positioned in said at least one housing in each growing unit of said first and second pluralities of interconnected fluid carrying growing units.

28. The system of claim 27, wherein said at least one housing in each growing unit of said first and second pluralities of interconnected fluid carrying growing units contains a growing medium and at least one of said fluid delivery members releases the fluid into said growing medium.

* * * * *